(12) United States Patent
Wilson et al.

(10) Patent No.: US 9,106,575 B2
(45) Date of Patent: Aug. 11, 2015

(54) MULTIPLEXING MULTIPLE SERIAL INTERFACES

(71) Applicant: Apple Inc., Cupertino, CA (US)

(72) Inventors: Thomas J. Wilson, Pleasanton, CA (US); Yutaka Hori, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 156 days.

(21) Appl. No.: 13/756,222

(22) Filed: Jan. 31, 2013

(65) Prior Publication Data

US 2014/0211817 A1  Jul. 31, 2014

(51) Int. Cl.
*H04L 12/56* (2006.01)
*H04L 12/935* (2013.01)
*H04L 12/931* (2013.01)

(52) U.S. Cl.
CPC .............. *H04L 49/30* (2013.01); *H04L 49/00* (2013.01)

(58) Field of Classification Search
USPC ........................................................ 370/542
See application file for complete search history.

(56) References Cited

U.S. PATENT DOCUMENTS

| | | | |
|---|---|---|---|
| 4,485,376 A * | 11/1984 | Noble | 345/4 |
| 4,656,620 A * | 4/1987 | Cox | 370/536 |
| 6,259,693 B1 * | 7/2001 | Ganmukhi et al. | 370/366 |
| 7,965,722 B2 * | 6/2011 | Futch et al. | 370/401 |
| 8,537,644 B2 * | 9/2013 | Lennard et al. | 369/13.24 |
| 8,565,355 B2 * | 10/2013 | Ludwig | 375/340 |
| 2002/0105968 A1 * | 8/2002 | Pruzan et al. | 370/465 |
| 2004/0240430 A1 * | 12/2004 | Lin et al. | 370/352 |
| 2005/0125709 A1 * | 6/2005 | McKim et al. | 714/25 |
| 2005/0227695 A1 * | 10/2005 | Rasanen et al. | 455/436 |
| 2006/0190905 A1 * | 8/2006 | Martin et al. | 716/18 |
| 2008/0147901 A1 * | 6/2008 | Gloekler et al. | 710/11 |
| 2008/0219248 A1 * | 9/2008 | Mott et al. | 370/363 |
| 2009/0072858 A1 * | 3/2009 | D'Souza et al. | 326/47 |
| 2009/0222251 A1 * | 9/2009 | Gloekler et al. | 703/14 |
| 2009/0262720 A1 * | 10/2009 | Kwon et al. | 370/342 |
| 2010/0097942 A1 * | 4/2010 | Cole | 370/248 |
| 2012/0000287 A1 * | 1/2012 | Frangi et al. | 73/514.32 |
| 2013/0085704 A1 * | 4/2013 | Stanley et al. | 702/118 |
| 2014/0036645 A1 * | 2/2014 | Lennard et al. | 369/13.24 |

* cited by examiner

*Primary Examiner* — Melvin Marcelo
*Assistant Examiner* — Peter Solinsky
(74) *Attorney, Agent, or Firm* — Park, Vaughan, Fleming & Dowler LLP; Steven E. Stupp

(57) ABSTRACT

An integrated circuit with two operating modes is described. During a first operating mode, a de-multiplexer selectively couples information received via a common set of pads to first control logic, which decodes the information based on a first serial-interface technique. Moreover, during a second operating mode, the de-multiplexer selectively couples a first portion of the information to the first control logic and a second portion of the information to second control logic, which decodes the second portion based on a second serial-interface technique. By facilitating time-domain de-multiplexing of two similar serial-interface techniques, the integrated circuit can overcome the constraints imposed by a low or limited pin count.

20 Claims, 7 Drawing Sheets

MULTIPLEXING MULTIPLE SERIAL INTERFACES

BACKGROUND

1. Field

The described embodiments relate to techniques for communicating information. More specifically, the described embodiments relate to techniques for time-multiplexing data packets associated with multiple serial-interface techniques or protocols to an integrated circuit.

2. Related Art

Scaling of semiconductor technology to ever-smaller critical dimensions is allowing commensurate increases in the functionality supported by integrated circuits and electronic devices. However, the available real-estate for contact pins or pads on an integrated circuit is often constrained. As a consequence, it is often difficult to obtain sufficient pads on an integrated circuit to support the functionality that can be included in circuits on the integrated circuit. This interface bottleneck can limit the functionality provided by integrated circuits, which is a source of frustration and can increase the cost of integrated circuits and electronic devices.

SUMMARY

The described embodiments include an integrated circuit with a de-multiplexer that receives information via a common set of pads. Moreover, first control logic in the integrated circuit, which is selectively coupled to the de-multiplexer circuit, decodes at least some of the information based on a first serial-interface technique. Furthermore, second control logic in the integrated circuit, which is selectively coupled to the de-multiplexer circuit, decodes at least some of the information based on a second serial-interface technique. In particular, during a first operating mode of the integrated circuit, the de-multiplexer circuit selectively couples the information to the first control logic, and during a second operating mode of the integrated circuit the de-multiplexer circuit selectively couples a first portion of the information to the first control logic and a second portion of the information to the second control logic.

Note that the first serial-interface technique and the second serial-interface technique may each be associated with a four-wire serial interface. For example, the first serial-interface technique and the second serial-interface technique may include: a Serial Peripheral Interface (SPI), a Joint Test Action Group (JTAG) interface and/or a serial interface that has a similar 4-wire input/output interface. Therefore, the set of pads may include four pads.

The information associated with the first serial-interface technique and the second serial-interface technique may include data packets. During the second operation mode, the first portion may include data packets in some clock cycles and the second portion may include data packets in a remainder of the clock cycles. Moreover, duty cycles and/or data rates of the data packets in the first portion and the second portion may be specified by control information in the information. In some embodiments, during the second operation mode, a data rate associated with the information may be increased relative to that in the first operating mode.

Furthermore, the de-multiplexer may transition from the first operating mode to the second operating mode when the information includes a pre-defined data pattern. Additionally, the de-multiplexer may transition from the second operating mode to the first operating mode when the information includes a second pre-defined data pattern.

In some embodiments, the de-multiplexer provides operating-mode information via the set of pads.

Another embodiment provides an electronic device that includes the integrated circuit.

Another embodiment provides a method for communicating information, which may be performed by the integrated circuit. During operation, the integrated circuit receives the information using the common set of pads and the de-multiplexer circuit. Then, during the first operating mode, the de-multiplexer circuit selectively couples the information from the de-multiplexer circuit to the first control logic, which decodes the information based on the first serial-interface technique. Moreover, during the second operating mode, the de-multiplexer circuit selectively couples the first portion of the information from the de-multiplexer circuit to the first control logic which decodes the first portion of the information based on the first serial-interface technique, and selectively couples the second portion of the information from the de-multiplexer circuit to the second control logic which decodes the second portion of the information based on the second serial-interface technique.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
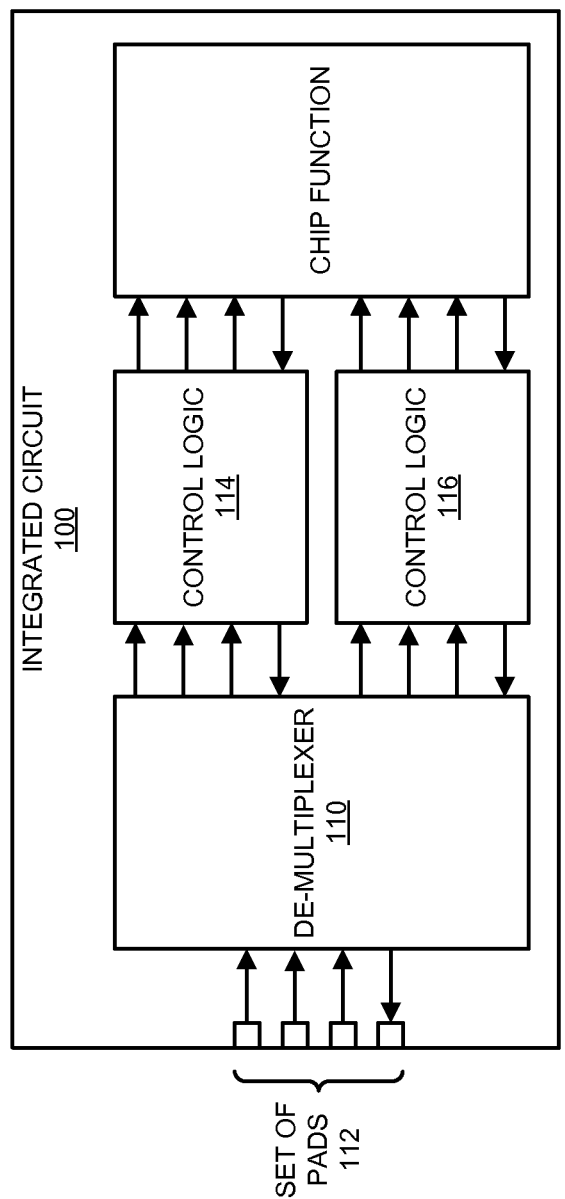
FIG. 1 is a block diagram illustrating an integrated circuit in accordance with an embodiment of the present disclosure.

FIG. 1 presents a block diagram illustrating an integrated circuit 100. This integrated circuit includes a de-multiplexer 110 that receives information via a common set of pads 112. Moreover, control logic 114, which is selectively coupled to de-multiplexer circuit 110, decodes at least some of the information based on a first serial-interface technique. Furthermore, control logic 116, which is selectively coupled to de-multiplexer circuit 110, decodes at least some of the information based on a second serial-interface technique. In particular, during a first operating mode of integrated circuit 100, de-multiplexer circuit 110 selectively couples the information to control logic 114, and during a second operating mode of integrated circuit 100, de-multiplexer circuit 110 selectively couples a first portion of the information to control logic 114 and a second portion of the information to control logic 116.

Note that the first serial-interface technique and the second serial-interface technique may each be associated with a four-wire serial interface. For example, the first serial-interface technique and the second serial-interface technique may include: a Serial Peripheral Interface (SPI), a Joint Test Action Group (JTAG) interface and/or a serial interface that has a similar 4-wire input/output interface. Therefore, set of pads 112 may include four pads.

By providing at least a two-in-one interface, the communication technique can provide a solution to the low or limited (digital) pin count in many integrated circuits. In the process, the communication technique may provide time-domain multiplexing of two similar 4-wire serial-interface protocols or techniques.

Figure 2:
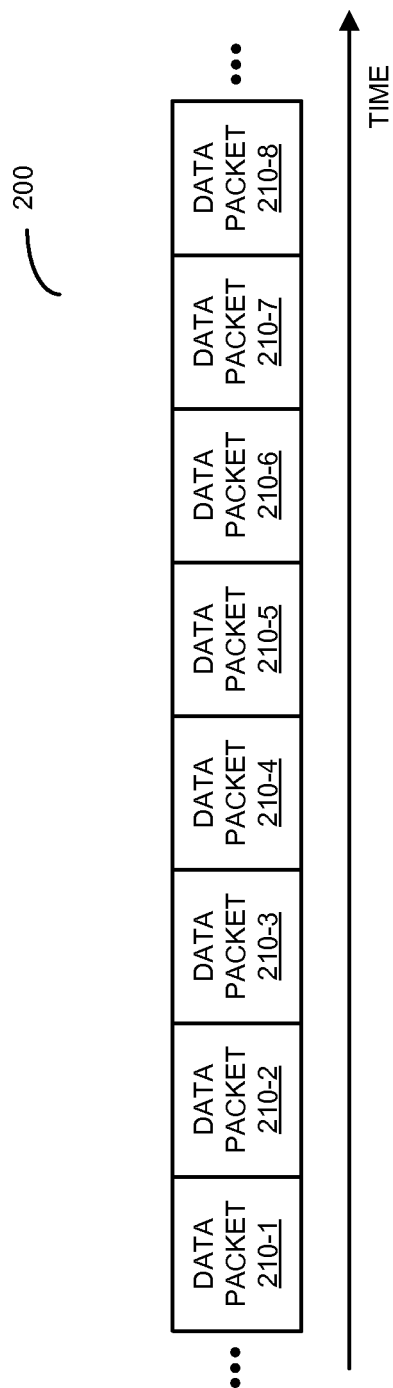
FIG. 2 is a drawing illustrating information communicated to the integrated circuit of FIG. 1 in the second operating mode in accordance with an embodiment of the present disclosure.

The time-domain multiplexing is shown in FIG. 2, which presents a drawing illustrating information communicated to integrated circuit 100 (FIG. 1) in the second operating mode. In particular, the information associated with the first serial-interface technique and the second serial-interface technique may include data packets 210. During the second operation mode, the first portion may include data packets in some clock cycles and the second portion may include data packets in a remainder of the clock cycles. For example, data packets 210-1 and 210-5 may be selectively coupled to control logic 114 (FIG. 1), and data packets 210-2, 210-3, 210-4, 210-6, 210-7 and 210-8 may be selectively coupled to control logic 116 (FIG. 1). In general, a variety of duty cycles or weightings between control logic 114 (FIG. 1) and control logic 116 (FIG. 1) may be used in the second operating mode. Moreover, duty cycles and/or data rates of data packets 210 in the first portion and the second portion may be specified by control information in the information (for example, in a header). In some embodiments, during the second operation mode, a data rate associated with the information may be increased relative to that in the first operating mode. For example, the data rate during the second operating mode may be 6-7 times higher than that in the first operating mode.

Referring back to FIG. 1, de-multiplexer 110 may transition from the first operating mode to the second operating mode when the information includes a pre-defined data pattern. For example, the pre-defined data pattern may be '0 1 0 0.' De-multiplexer 110 may scan repeatedly or continuously for this pre-defined data pattern or every N clock cycles (e.g., every 3 or 4 clock cycles). When the pre-defined data pattern is received, de-multiplexer 110 may transmit an acknowledgment signal or provide an indication that it has transitioned to the second operating mode. Note that the first operating mode may be the default state of de-multiplexer 110.

Additionally, de-multiplexer 110 may transition from the second operating mode to the first operating mode when the information includes a second pre-defined data pattern, which functions as a 'reset' signal. For example, the second pre-defined data pattern may be '0 1 1 0.'

In some embodiments, de-multiplexer 110 provides operating-mode information via set of pads 112. For example, one of set of pads 112 may be used to convey a data packet to a source of the information. This data packet may include a header that specifies the current operating mode of integrated circuit 100.

Figure 3:
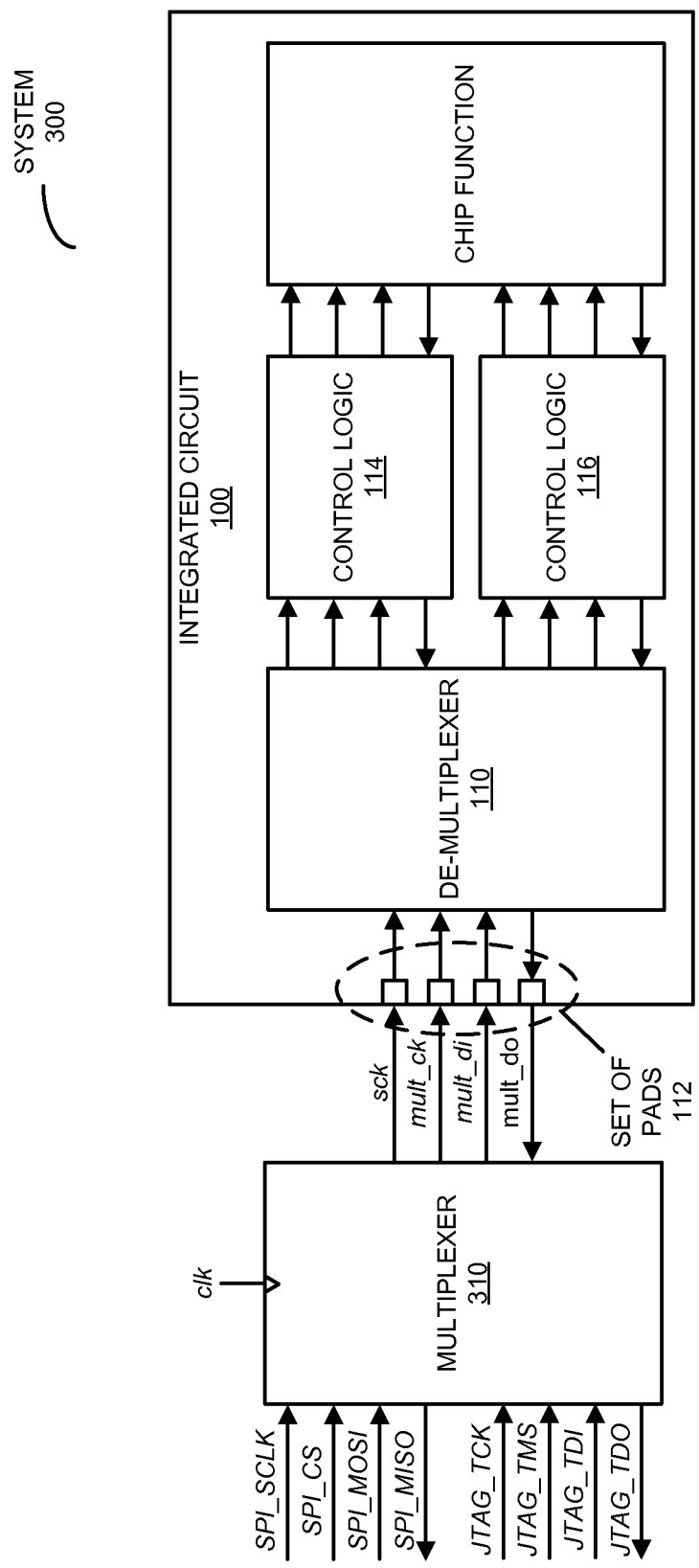
FIG. 3 is a block diagram illustrating a system that includes the integrated circuit of FIG. 1 in accordance with an embodiment of the present disclosure.

In an exemplary embodiment, the first serial-interface technique includes SPI, and the second serial-interface technique includes JTAG. This is shown in FIG. 3, which presents a block diagram of a system 300 that includes an integrated circuit 100. In this system, multiplexer 310 multiplexes and de-multiplexer 110 de-multiplexes two 4-wire serial-interface techniques over a common 4-wire interface. This may be useful when having two separate 4-wire interfaces, such as an SPI port and a JTAG debug port, is not possible. In particular, the common 4-wire interface (which is sometimes referred to as a 'protocol modem bus'), which couples multiplexer 310 and de-multiplexer 110, may include wires that convey: a source-synchronous serial-bit clock (sck) from multiplexer 310; a multiplexer-to-de-multiplexer signal (mult_ck) with the protocol clock information or the clock states associated with the serial-interface techniques; a multiplexer-to-de-multiplexer signal (mult_di) with other target-chip (i.e., integrated circuit 100) input data (such as: SPI_CS, SPI_MOSI, JTAG_TMS, JTAG_TDI, etc.); and a de-multiplexer-to-multiplexer signal (mult_do) with target-chip output data state or serial-data output from the serial-interface techniques. Typically, the second operating mode may be used during development/a debug phase of system 300. Once the debugging of the chip firmware is complete, the JTAG debug port may not be needed, and this port may be used as an SPI port.

In system 300, multiplexer 310 may be implemented using a programmable logic device or a field-programmable gate array on a development or a bring-up board. This board may not be included in the final product(s) because the debug interface may only be needed during the development phase. Moreover, de-multiplexer 110 may be implemented on a target chip, e.g., near the pad-ring, in order to minimize the internal signal delay and skew.

On power-up and reset, de-multiplexer 110 may be configured to default to the first operating mode and to bypass the 4-wire interface directly to the SPI module (i.e., control logic 114). Furthermore, in the second operating mode, multiplexer 310 can accommodate two serial-interface techniques, SPI and JTAG. In particular, a high-frequency clock (clk) to multiplexer 310 (such as a 50-MHz clock) samples the input signals of the two serial-interface techniques, and continuously transmits data packets. Note that the clock signal from the bottom of the clock-tree that is used to multiplex the two serial-interface techniques in multiplexer 310 may be output on the 'sck' pin. Moreover, the sampled serial-interface-technique clocks (SPI_SCLK and JTAG_TCK) may be multiplexed and output on the 'mult_ck' line roughly every other cycle. (More generally, other values of the duty cycle of the information associated with the serial-interface techniques may be used.) Furthermore, this 'mult_ck' line may also carry 2-sck-cycle synchronization bits once in every 66 sck cycles. This synchronization information may be followed by 32 pairs of SPI_SCLK and JTAG_TCK samples.

Note that a frame that contains the synchronization information and two pairs of serial-interface-technique clock information may be called an 's-frame' (6-clock-cycle synchronization frame). In contrast, a frame with two pairs of serial-interface-technique clock information that is not preceded by the synchronization information may be called a 'c-frame' (a 4-clock-cycle clock frame). Therefore, the overall two serial-interface-technique clock-multiplexing rate may be 32 over 66 cycles (or 16 over 33 cycles). However, in general the clock signals may first need to be synchronized to clk, e.g., using double-length flip flop. Therefore, the theoretical clock-multiplexing rate may be four-times smaller (i.e., 4 over 33 cycles).

Figure 4:
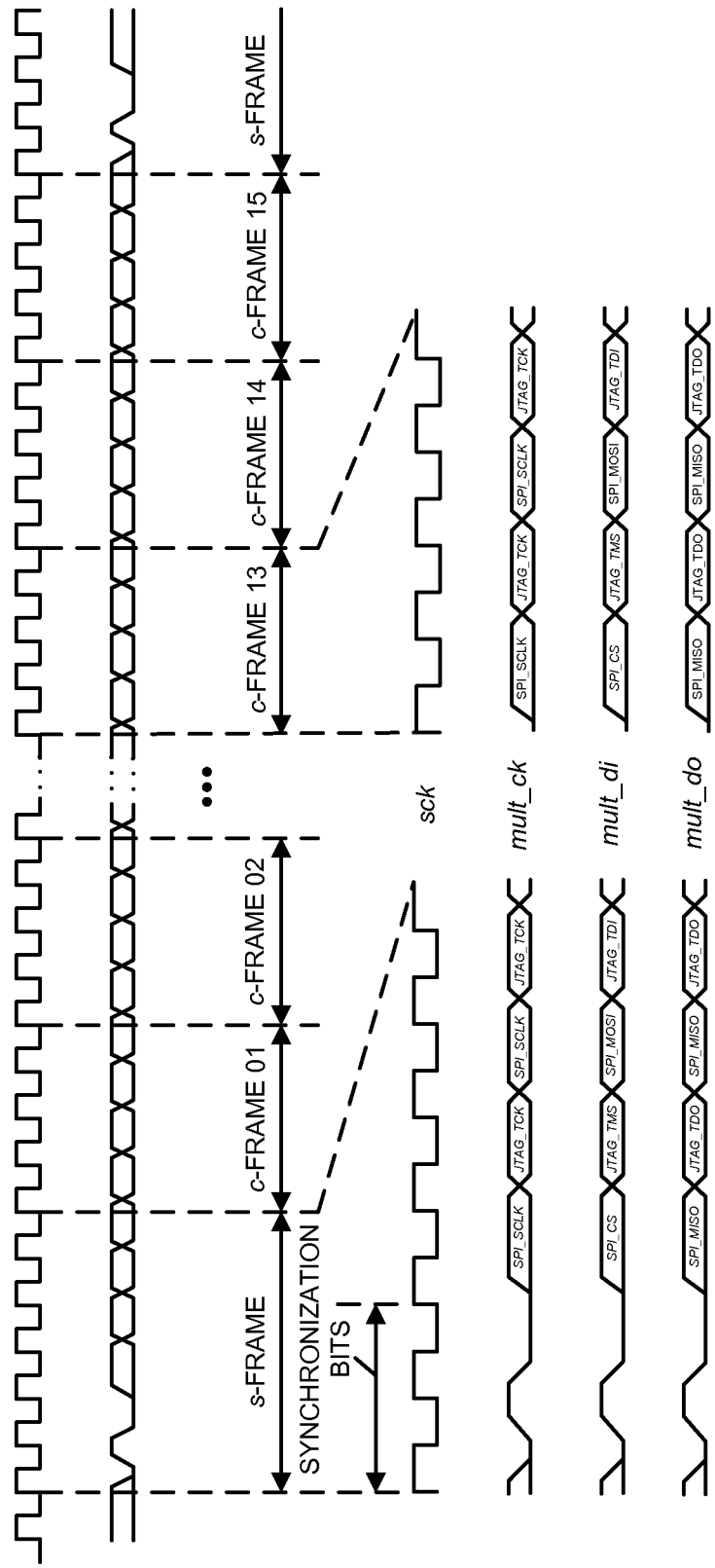
FIG. 4 is a timing diagram illustrating bus timing in the system of FIG. 3 in accordance with an embodiment of the present disclosure.

FIG. 4 is a timing diagram illustrating bus timing in system 300 (FIG. 3). As noted previously, a high-speed (approximately 50 MHz) clock is used for sampling the serial-interface-technique signals, and data packets are transmitted continuously. A given data packet may include a synchronization frame and 15 clock frames. Moreover, a synchronization frame may include the synchronization information and two pairs of SPI/JTAG clock states. Furthermore, a clock frame includes two pairs of SPI/JTAG clock states.

Additionally, either power on or reset sets system 300 (FIG. 3) to the first operating mode (i.e., the SPI mode). During the first operating mode, signals are bypassed by de-multiplexer 110 to and from control logic 114. Moreover, the second operating mode may be enabled when the first synchronization information is received by de-multiplexer 110. (In general, once this occurs, there is no need to transmit the synchronization information until the next time the chip is reset. However, in some embodiments the bus protocol may require periodic synchronization information to ensure the synchronization between multiplexer 310 and de-multiplexer 110 in FIG. 3.) In the second operating mode, de-multiplexer 110 may split the incoming serialized clocks and data, and then may recover the serial-interface-technique signals. In addition, de-multiplexer 110 may multiplex outgoing serial data from SPI and JTAG.

As shown in FIG. 4, the 'mult_ck' pin conveys the synchronization information and the serial-interface-technique clock information. Multiplexer 310 (FIG. 3) may transmit a 2-cycle synchronization bit pattern once in every 66 sck cycles. This bit pattern may be four consecutive half-cycle bit streams of '0 1 0 0.' After the synchronization information, 32 pairs of the serial-interface-technique clock information may be conveyed. Each pair of the information may contain the clock state of the two serial-interface techniques that are multiplexed. Note that the clock signals may be synchronized to 'sck' before they are sampled.

Moreover, the 'mult_di' pin carries the state of other serial signals from the two serial-interface techniques to de-multiplexer 110 (FIGS. 1 and 3) on the target chip (i.e., integrated circuit 100 in FIGS. 1 and 3). In particular, the state of the other serial signals may include: SPI_CS and SPI_SDI (MOSI) for SPI, and JTAG_TMS and JTAG_TDI for JTAG. Multiplexer 310 (FIG. 3) may multiplex these signals on the 'mult_di' pin. Moreover, these signals may also be synchronized to 'sck' before they are sampled. During the serial-interface-technique clock-information cycles, the 'mult_di' pin may output the status of the four signals in the following order: SPI_CS, JTAG_TMS, SPI_SDI, and JTAG_TDI. Note that this pin may drive 0s or command information during the synchronization cycles.

Furthermore, the 'mult_do' pin carries the state of the serial-interface-technique signals from de-multiplexer 110 (FIGS. 1 and 3) on the target chip. In particular, during the second operating mode the state of the serial-interface-technique signals may include: SPI_SDO (MISO) for SPI, and JTAG_TDO for JTAG. Multiplexer 310 (FIG. 3) may sample the pin in the following order for the serial-interface-technique clock-information cycles: SPI_SDO and JTAG_TDO. Then, multiplexer 310 (FIG. 3) may split the signal states and output to the respected serial-interface techniques.

During the second operating mode, de-multiplexer 110 (FIGS. 1 and 3) de-multiplexes the multiplexed serial-interface techniques to individual serial-interface techniques. In particular, de-multiplexer 110 (FIGS. 1 and 3) takes a single set of two serial-bit stream inputs with the serial-bit clock (sck) and recreates two serial-interface techniques. De-multiplexer 110 (FIGS. 1 and 3) also multiplexes the serial-data output signal from each of two serial-interface techniques and sends it to multiplexer 310 (FIG. 3).

Figure 5:
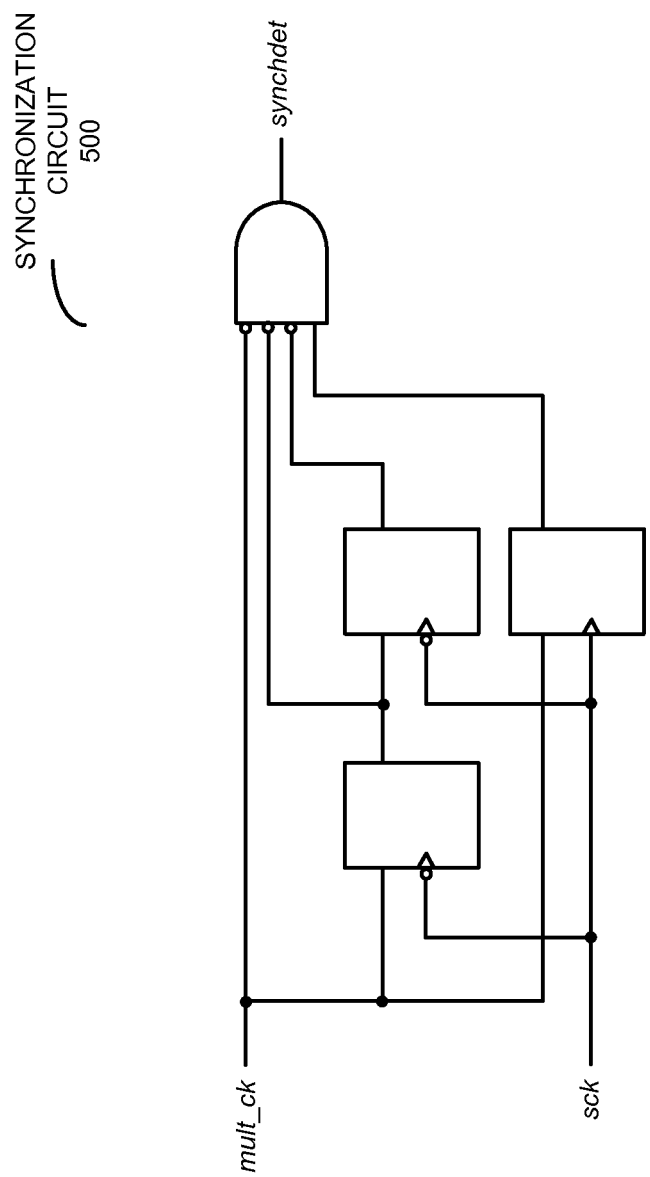
FIG. 5 is a block diagram illustrating a synchronization circuit in accordance with an embodiment of the present disclosure.

In some embodiments, receipt of the synchronization information resets an internal 7-bit counter to 63. The counter may be decremented by a positive edge of 'sck.' This counter may be used to identify what information is on the serial-data lines according to the serial-interface technique if the counter value is less than 64. Note that, if the value is larger than or equal to 64, de-multiplexer 110 (FIGS. 1 and 3) may not sample the serial lines. Furthermore, if the counter fails to receive the synchronization information, then the counter may wrap to 127 and may keep this value until the next synchronization information is received. As shown in FIG. 5, which presents a block diagram illustrating a synchronization circuit 500, the synchronization-information detection (synchdet) may be performed using two negative-edge flip-flops, one positive-edge flip-flop and a 4-input AND gate.

Based on the synchronization counter value, de-multiplexer 110 (FIGS. 1 and 3) may sample the value of the serial-data lines (mult_ck and mult_di). The sampled data may be kept by a flip-flop until the next sampling cycle. Therefore, there may be at least one flip-flop for each serial-interface-technique signal. Note that: SPI_SCLK may be updated if the counter value is less than 64, and counter[0]==1'b1; SPI_CS may be updated if the counter value is less than 64, and counter[1:0]==2'b11; SPI_SDI may be updated if the counter value is less than 64, and counter[1:0]==2'b01; JTAG_TCK may be updated if the counter value is less than 64, and counter[0]==1'b0; JTAG_TMS may be updated if the counter value is less than 64, and counter[1:0]==2'b10; and JTAG_TDI may be updated if the counter value is less than 64, and counter[1:0]==2'b00.

Figure 6:
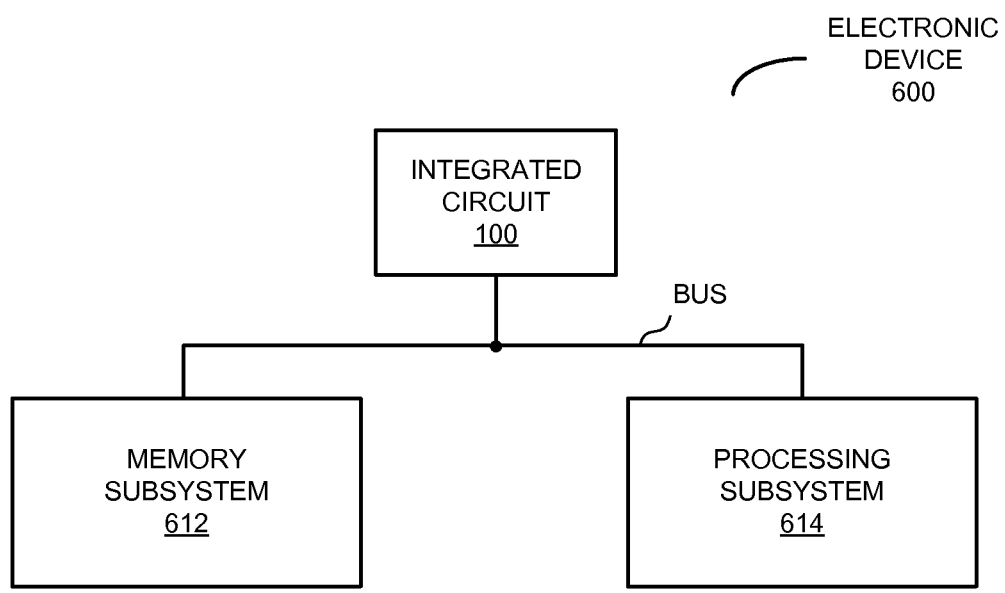
FIG. 6 is a block diagram illustrating an electronic device that includes the integrated circuit of FIG. 1 in accordance with an embodiment of the present disclosure.

We now describe embodiments of an electronic device. FIG. 6 presents a block diagram illustrating an electronic device 600 that includes integrated circuit 100.

Figure 7:
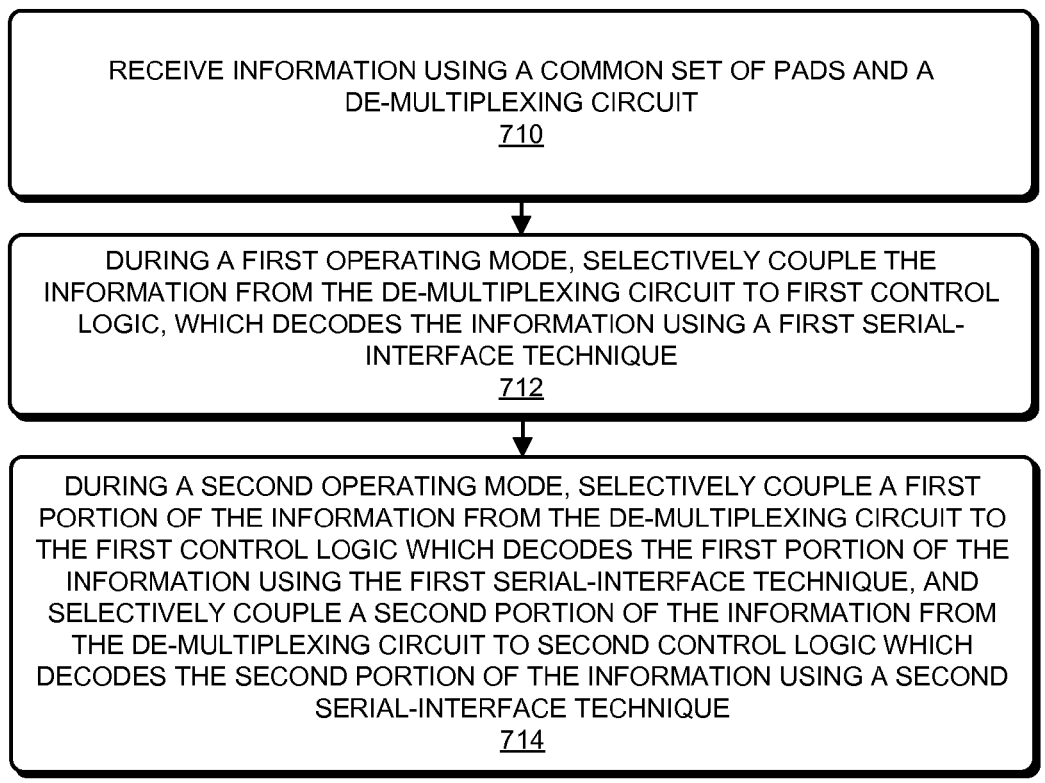
FIG. 7 is a flowchart illustrating a method for communicating information in accordance with an embodiment of the present disclosure.

We now describe embodiments of a method. FIG. 7 presents a flowchart illustrating a method 700 for communicating information, which may be performed by an integrated circuit, such as integrated circuit 100 (FIG. 1). During operation, the integrated circuit receives the information using the common set of pads and the de-multiplexer circuit (operation 710). Then, during the first operating mode, the de-multiplexer circuit selectively couples the information from the de-multiplexer circuit to the first control logic, which decodes the information based on the first serial-interface technique (operation 712). Moreover, during the second operating mode, the de-multiplexer circuit selectively couples the first portion of the information from the de-multiplexer circuit to the first control logic and decodes the first portion of the information based on the first serial-interface technique, and selectively couples the second portion of the information from the de-multiplexer circuit to the second control logic and decodes the second portion of the information based on the second serial-interface technique (operation 714).

In some embodiments of method 700, there may be additional or fewer operations. Moreover, the order of the operations may be changed, and/or two or more operations may be combined into a single operation.

Referring back to FIG. 6, in general functions of integrated circuit 100 (FIG. 1) may be implemented in hardware and/or in software. Thus, electronic device 600 may include one or more program modules or sets of instructions stored in a memory subsystem 612 (such as DRAM or another type of volatile or non-volatile computer-readable memory), which may be executed by a processing subsystem 614. (In general, the communication technique may be implemented more in hardware and less in software, or less in hardware and more in software, as is known in the art.) Note that the one or more computer programs may constitute a computer-program mechanism. Furthermore, instructions in the various modules in memory subsystem 612 may be implemented in: a high-level procedural language, an object-oriented programming language, and/or in an assembly or machine language. Note that the programming language may be compiled or interpreted, e.g., configurable or configured, to be executed by processing subsystem 614.

Components in integrated circuit 100 (FIG. 1) and electronic device 600 may be coupled by signal lines, links or buses. In general these connections may include electrical, optical, or electro-optical communication of signals and/or data. Furthermore, in the preceding embodiments, some components are shown directly connected to one another, while others are shown connected via intermediate components. In each instance the method of interconnection, or 'coupling,' establishes some desired communication between two or more circuit nodes, or terminals. Such coupling may often be accomplished using a number of circuit configurations, as will be understood by those of skill in the art; for example, AC coupling and/or DC coupling may be used.

In some embodiments, functionality in these circuits, components and devices may be implemented in one or more: application-specific integrated circuits (ASICs), field-programmable gate arrays (FPGAs), and/or one or more digital signal processors (DSPs). Moreover, the circuits and components may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An output of a process for designing an integrated circuit, or a portion of an integrated circuit, comprising one or more of the circuits described herein may be a computer-readable medium such as, for example, a magnetic tape or an optical or magnetic disk. The computer-readable medium may be encoded with data structures or other information describing circuitry that may be physically instantiated as an integrated circuit or portion of an integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on a computer-readable medium. Those of skill in the art of integrated circuit fabrication can use such encoded data to fabricate integrated circuits comprising one or more of the circuits described herein.

Electronic device 600 may include one of a variety of devices that can include an integrated circuit, including: a desktop computer, a server, a laptop computer, a media player (such as an MP3 player), an appliance, a subnotebook/netbook, a tablet computer, a peripheral device (such as a trackpad, a touchscreen, a mouse, a camera, a display, a keyboard, a user-interface device, etc.), a smartphone, a cellular telephone, a network appliance, a set-top box, a personal digital assistant (PDA), a toy, a controller, a digital signal processor, a game console, a device controller, a computational engine within an appliance, a consumer-electronic device, a portable computing device or a portable electronic device, a personal organizer, and/or another electronic device.

Although we use specific components to describe the preceding embodiments, in alternative embodiments different components and/or subsystems may be used. For example, instead of de-multiplexer 110 (FIG. 1), a decoder circuit, de-modulator circuit or a splitter circuit may be used. Additionally, one or more of the components may not be present in these embodiments. In some embodiments, the embodiments in FIGS. 1, 3, 5 and 6 include one or more additional components that are not shown in FIGS. 1, 3, 5 and 6. For example, the preceding embodiments may be used to demodulate more than two serial-interface techniques that are received on a common set of pads. Also, although separate components are shown in FIGS. 1, 3, 5 and 6, in some embodiments some or all of a given component can be integrated into one or more of the other components and/or positions of components can be changed. Alternatively, integrated components can be implemented as separate components. For example, in some embodiments control logic 114 and 116 in FIG. 1 are implemented separately from integrated circuit 100, which includes de-multiplexer 110.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An integrated circuit, comprising:
    a de-multiplexer circuit configured to receive information via a common set of pads;
    first control logic, selectively coupled to the de-multiplexer circuit, configured to decode at least some of the information based on a first serial-interface technique; and
    second control logic, selectively coupled to the de-multiplexer circuit, configured to decode at least some of the information based on a second serial-interface technique,
    wherein, during a first operating mode, the de-multiplexer circuit is configured to selectively couple the information to the first control logic, and
    wherein, during a second operating mode, the de-multiplexer circuit is configured to selectively couple a first portion of the information to the first control logic and a second portion of the information to the second control logic.

2. The integrated circuit of claim 1, wherein the first serial-interface technique and the second serial-interface technique are each associated with a four-wire serial interface.

3. The integrated circuit of claim 1, wherein the first serial-interface technique and the second serial-interface technique are selected from the group consisting of: a Serial Peripheral Interface (SPI), and a Joint Test Action Group (JTAG) interface.

4. The integrated circuit of claim 1, wherein the set of pads includes four pads.

5. The integrated circuit of claim 1, wherein the information associated with the first serial-interface technique and the second serial-interface technique includes data packets.

6. The integrated circuit of claim 5, wherein, during the second operation mode, the first portion includes data packets in some clock cycles and the second portion includes data packets in a remainder of the clock cycles.

7. The integrated circuit of claim 6, wherein duty cycles and data rates of the data packets in the first portion and the second portion are specified by control information in the information.

8. The integrated circuit of claim 1, wherein, during the second operation mode, a data rate associated with the information is increased relative to that in the first operating mode.

9. The integrated circuit of claim 1, wherein the de-multiplexer is configured to transition from the first operating mode to the second operating mode when the information includes a pre-defined data pattern.

10. The integrated circuit of claim 9, wherein the de-multiplexer is configured to transition from the second operating mode to the first operating mode when the information includes a second pre-defined data pattern.

11. The integrated circuit of claim 1, wherein the de-multiplexer is further configured to provide operating-mode information via the set of pads.

12. An electronic device, comprising:
a de-multiplexer circuit configured to receive information via a common set of pads;
first control logic, selectively coupled to the de-multiplexer circuit, configured to decode at least some of the information based on a first serial-interface technique; and
second control logic, selectively coupled to the de-multiplexer circuit, configured to decode at least some of the information based on a second serial-interface technique, wherein, during a first operating mode, the de-multiplexer circuit is configured to selectively couple the information to the first control logic, and
wherein, during a second operating mode, the de-multiplexer circuit is configured to selectively couple a first portion of the information to the first control logic and a second portion of the information to the second control logic.

13. The electronic device of claim 12, wherein the first serial-interface technique and the second serial-interface technique are each associated with a four-wire serial interface.

14. The electronic device of claim 12, wherein the first serial-interface technique and the second serial-interface technique are selected from the group consisting of: a Serial Peripheral Interface (SPI), and a Joint Test Action Group (JTAG) interface.

15. The electronic device of claim 12, wherein the information associated with the first serial-interface technique and the second serial-interface technique includes data packets.

16. The electronic device of claim 15, wherein, during the second operation mode, the first portion includes data packets in some clock cycles and the second portion includes data packets in a remainder of the clock cycles.

17. The electronic device of claim 12, wherein the de-multiplexer is configured to transition from the first operating mode to the second operating mode when the information includes a pre-defined data pattern.

18. The electronic device of claim 17, wherein the de-multiplexer is configured to transition from the second operating mode to the first operating mode when the information includes a second pre-defined data pattern.

19. The electronic device of claim 12, wherein the de-multiplexer is further configured to provide operating-mode information via the set of pads.

20. A method for communicating information, comprising:
receiving the information using a common set of pads and a de-multiplexer circuit;
during a first operating mode, selectively coupling the information from the de-multiplexer circuit to first control logic and decoding the information based on a first serial-interface technique; and
during a second operating mode, selectively coupling a first portion of the information from the de-multiplexer circuit to the first control logic and decoding the first portion of the information based on the first serial-interface technique, and selectively coupling a second portion of the information from the de-multiplexer circuit to second control logic and decoding the second portion of the information based on a second serial-interface technique.

* * * * *